United States Patent
Sohn et al.

(10) Patent No.: US 8,155,031 B2
(45) Date of Patent: Apr. 10, 2012

(54) WIRELESS AUDIO TRANSCEIVER SYSTEM AND METHOD USING UWB WIRELESS COMMUNICATION

(75) Inventors: Jong-Moo Sohn, Daejon (KR); Eun-Chang Choi, Daejon (KR); Jae-Doo Huh, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 549 days.

(21) Appl. No.: 12/373,367

(22) PCT Filed: Jul. 10, 2007

(86) PCT No.: PCT/KR2007/003342
§ 371 (c)(1),
(2), (4) Date: Jan. 12, 2009

(87) PCT Pub. No.: WO2008/007891
PCT Pub. Date: Jan. 17, 2008

(65) Prior Publication Data
US 2010/0003929 A1 Jan. 7, 2010

(30) Foreign Application Priority Data

Jul. 11, 2006 (KR) .................. 10-2006-0065108

(51) Int. Cl.
*H04Q 11/00* (2006.01)
(52) U.S. Cl. ........ 370/271; 370/338; 370/431; 370/537; 370/395.1; 455/73; 455/67.11; 700/94
(58) Field of Classification Search ............ 455/73, 455/420, 426.1, 421, 423, 435.1, 67.11, 41.2, 455/524, 450, 556.1; 370/338, 271, 431, 537, 395.1; 375/146; 700/94
See application file for complete search history.

(56) References Cited

U.S. PATENT DOCUMENTS

| | | | |
|---|---|---|---|
| 6,684,060 B1 | 1/2004 | Curtin | |
| 6,799,056 B2 * | 9/2004 | Curley et al. | 455/556.1 |
| 2002/0102979 A1 | 8/2002 | Curley et al. | |
| 2002/0196955 A1 * | 12/2002 | Boesen et al. | 381/312 |
| 2004/0125777 A1 * | 7/2004 | Doyle et al. | 370/338 |
| 2005/0047379 A1 | 3/2005 | Boyden et al. | |
| 2005/0255844 A1 * | 11/2005 | Sugaya et al. | 455/426.1 |
| 2007/0245045 A1 * | 10/2007 | Wu | 710/62 |

FOREIGN PATENT DOCUMENTS

KR 10-2005-0005472 1/2005

* cited by examiner

*Primary Examiner* — Shaima Q Aminzay
(74) *Attorney, Agent, or Firm* — NSIP Law

(57) ABSTRACT

There is provided a transceiving method of an audio signal using an UWB wireless communication scheme, including the steps of: extracting and analyzing the beacon frames to generate reserved transmission interval information previously reserved by the other UWB transmitters and/or adjacent wireless audio transmitters and information on audio source and channel; calculating an available transmission interval for each channel of audio sources by using the information on the audio source and channel of the other UWB transmitters; generating and transmitting a beacon frame based on the reserved transmission interval and the audio source and channel information; transmitting the audio signal at the reserved transmission interval by audio source and channel units; extracting and analyzing the beacon frame to generate audio source and channel information and reserved transmission interval information; and providing the audio source and channel information to the user.

15 Claims, 6 Drawing Sheets

FIG. 4

| WIRELESS AUDIO TRANSMITTERS 401 | AUDIO SOURCES 402 | AUDIO CHANNELS 403 | CODECS 404 | OUTPUT VOLUME 405 | RESERVED TRANSMISSION INTERVALS 406 |
|---|---|---|---|---|---|
| FIRST TRANSMITTER | DVD | FL<br>FR<br>RL<br>RR<br>C<br>SW | AC-3<br>AC-3<br>AC-3<br>AC-3<br>AC-3<br>AC-3 | | |
| | TV | L<br>R | SBC<br>SBC | | |
| SECOND TRANSMITTER | MP3 PLAYER | L<br>R | MP3<br>MP3 | | |
| THIRD TRANSMITTER | MOBILE COMMUNI-CATION TERMINAL | L | PCM | | |

WIRELESS AUDIO TRANSCEIVER SYSTEM AND METHOD USING UWB WIRELESS COMMUNICATION

CROSS REFERENCE TO RELATED APPLICATIONS

This application claims the benefit under 35 U.S.C. Section 371, of PCT International Application Number PCT/KR2007/003342, filed Jul. 10, 2007 and Korean Application No. 10-2006-0065108 filed Jul. 11, 2006 in Korea, the contents of all of which are incorporated herein by reference.

TECHNICAL FIELD

The present invention relates to a wireless audio transceiver system and method using a UWB (Ultra WideBand) wireless communication, and more particularly, to a wireless audio transceiver system and method using a UWB wireless communication, wherein a wireless audio transmitter sends a digital audio signal by channels using a beacon frame and a reserved transmission interval and a wireless audio receiver receives the beacon frame to check the wireless audio transmitter, an audio source, an audio channel, an output volume and the reserved transmission interval, and extracts an audio signal from the reserved transmission interval of an audio source and outputs an audio channel selected by a user.

BACKGROUND ART

Recently, an audio system has been increasing number of audio channels in a single audio source for more realistic sound. Also, a speaker/earphone and so on have been continuously appearing for each audio reproduction by the generalization of new and diverse digital media and the advent of various kinds of terminal units that are suitable therefore.

As a scheme that can establish a single audio reproduction system in the home by integrating various kinds of terminal units, there is a scheme using a conventional audio receiver. The audio receiver receives each audio signal from various kinds of audio sources such as TV, CD player, DVD player, MP3 player, FM/AM tuner, cassette player, etc., and amplifies one of the audio signals selected by a user and outputs it to one or more speakers.

As mentioned above, the audio system has an increased number of audio channels from one audio source, like 4.1, 5.1, 6.1 and 7.1 channels, etc., beyond the past simple stereo system for more realistic sound, and at the same time has an increased number of speakers that are required for each channel. Thus, there exist wiring and arrangement problems in the home due to the increased number of speakers.

Hence, in the audio system having multi channel speakers, each speaker is connected to one amp or an A/V receiver incorporating an amp therein by wire or wireless. That is, the audio system employs a wired method since its wiring arrangement is relatively easy in case of front speakers, and a wireless method in case of rear/satellite speakers. This leads to the advent of products that facilitates the arrangement of speakers.

Among these products, there are products having the form of wireless headphone, not speaker. A transmitter having the form of a wireless headphone holder converts an output signal of an audio receiver into a wireless (RF or IR) signal and then transmits it to the wireless headphone. However, these products converts all input audio signals into analog signals and thereafter sends the analog signals using a radio frequency (RF) or an infrared rays (IR). Therefore, there may be a bad change in the quality of received signals by distance/directivity/obstacle between the transmitter and the receiver, which results in the degradation in quality of reproduced audio signals.

Further, the products also convert digital audio sources into analog signals and then transmit them, and thus, the quality of digital audio source in the audio source is not maintained in that state until the reproduction time thereof.

In addition, since the products are configured to always have pairs of transmitters and speakers (or headphones), no interlinking is made between heterogeneous products, hence the total number of speakers (or headphones) in the home cannot be reduced.

To solve the above-mentioned problems, there has been proposed a scheme that transmits and receives audio signals through a network using a wired network like Ethernet or PLC (Power Line Communication) based on the concept that the input of power is essential in all speaker output units.

However, since the wired network or PLC requires an IP-based network, its protocol is relatively complicated and there exists a difficulty in IP management as the number of units increases. Moreover, the wired network or PLC has a drawback that it cannot guarantee a desired quality of traffic if the traffic increases.

Further, the PLC scheme has a burden on an additional installment cost for configuration of initial PLC network that inherently has, and also a relatively small transmission bandwidth. In result, it is difficult to select such a PLC scheme.

Moreover, the PLC scheme requires a process of connecting a portable device to a power line or it thereto via a separate unit for connection with the portable device, thereby limiting mobility of the portable device.

Consequently, there is a need for improvement in the conventional audio system that it facilitates the arrangement and wiring of various speakers and maintains the original quality of audio signals, and various stationary and portable audio reproduction devices can reproduce audio signals freely through speakers already installed therein.

DISCLOSURE

Technical Problem

An embodiment of the present invention is directed to providing a wireless audio transceiver system and method using a UWB wireless communication, and more particularly, to a wireless audio transceiver system and method using a UWB wireless communication, wherein a wireless audio transmitter sends a digital audio signal by channels using a beacon frame and a reserved transmission interval and a wireless audio receiver receives the beacon frame to check the wireless audio transmitter, an audio source, an audio channel, an output volume and the reserved transmission interval, and extracts an audio signal from the reserved transmission interval of an audio source and outputs an audio channel selected by a user.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a wireless audio transceiver system including: a wireless audio transmitter transmitting an audio signal by channels during reserved transmission intervals indicated in a beacon frame; and a wireless audio receiver gathering information on audio sources, audio channels, an output volume and the reserved transmission interval, from the received beacon frames, extracting an audio signal from the user selected reserved transmission interval, and sending the extracted audio signal through the speaker.

In accordance with another aspect of the present invention, there is provided a transceiving method of an audio signal using a UWB wireless communication scheme, the method including the steps of: (a) when a beacon frame is received from other UWB transmitters and/or adjacent wireless audio transmitters, extracting and analyzing the beacon frame to generate reserved transmission interval information previously reserved by the other UWB transmitters and/or adjacent wireless audio transmitters and information on audio source and channel; (b) calculating an available transmission interval for each channel of audio sources by using the information on the audio source and channel of the other UWB transmitters and/or adjacent wireless audio transmitters and the reserved transmission interval information, and reserving the transmission interval; (c) generating and transmitting a beacon frame based on the reserved transmission interval and the audio source and channel information; (d) transmitting the audio signal at the reserved transmission interval per audio source and channel units; (e) when the transmitted beacon frame is received, extracting and analyzing the beacon frame to gather audio source and channel information and reserved transmission interval information; and (f) providing the audio source and channel information to the user, and extracting and outputting the audio signal from the selected reserved transmission interval when the audio source and channel information is selected by the user.

Advantageous Effects

As mentioned above and will be discussed below, the present invention enables the wireless audio transceiver system to be easily configured in arrangement and wiring in the home while maintaining the best audio quality, thereby removing the physical arrangement limitation of audio transmitter and receiver.

Further, the present invention allows the wireless audio transmitter to operate in link with a previously configured UWB network.

In addition, the present invention employs the wireless audio receiver that does not send a beacon frame, and thus can increase the number of wireless audio receivers without additionally occupying a bandwidth of the previously configured UWB network.

Moreover, the present invention allows the a portable audio reproducing device embedding the wireless audio transmitter to use the previously arranged wireless audio receiver without an extra wiring, thereby providing a wireless speaker capable of selecting various kinds of audio sources and audio channels.

BRIEF DESCRIPTION OF THE DRAWINGS

FIG. 4 is an explanatory diagram of one example of the audio source information list used in the present invention.

BEST MODE FOR THE INVENTION

The advantages, features and aspects of the invention will become apparent from the following description of the embodiments with reference to the accompanying drawings, which is set forth hereinafter. Thus, the present invention will be easily carried out by those skilled in the art. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
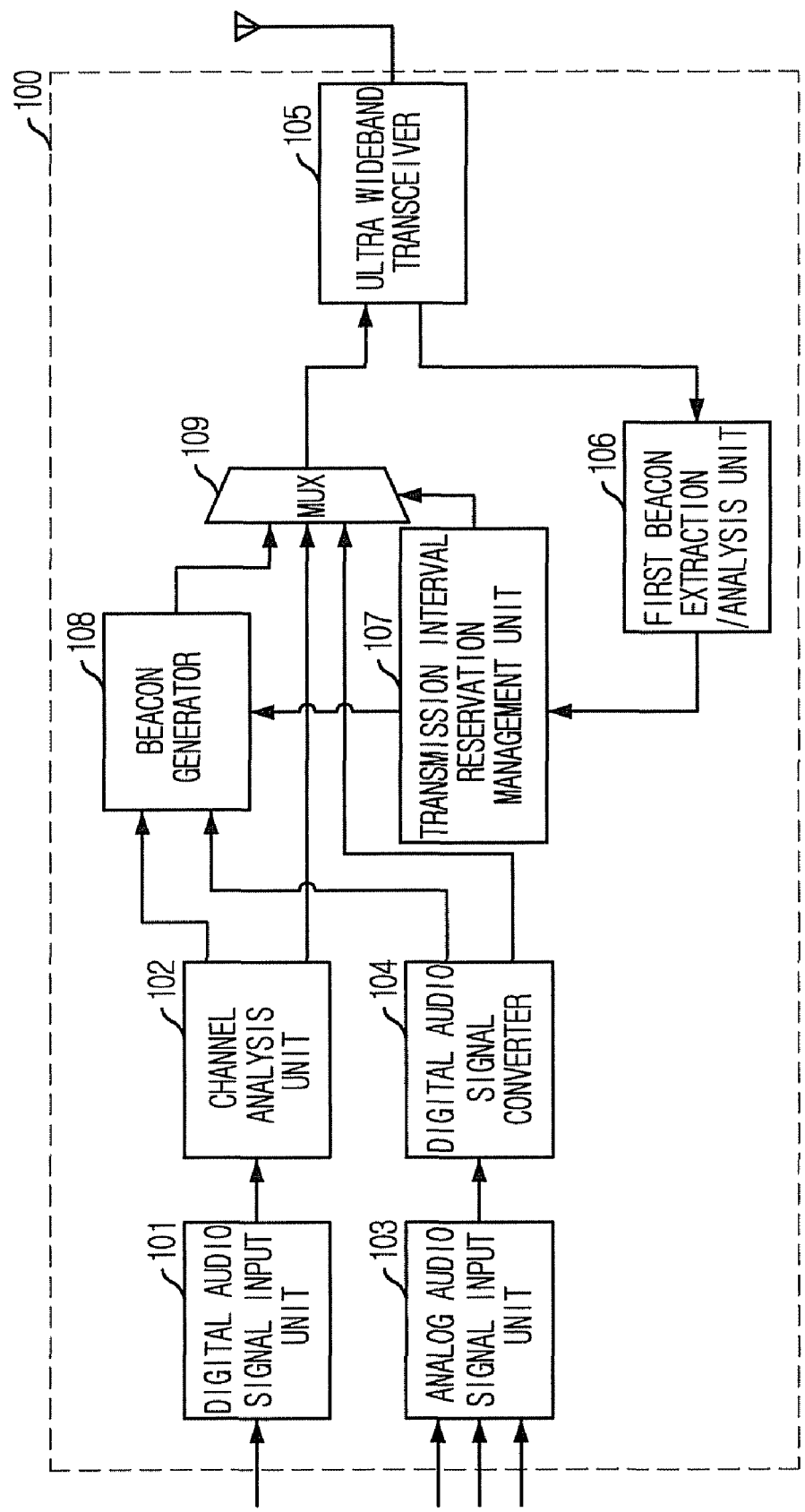
FIG. 1 is a block diagram illustrating the configuration of a wireless audio transmitter in accordance with a preferred embodiment of the present invention.

FIG. 1 is a block diagram illustrating the configuration of a wireless audio transmitter 100 in accordance with a preferred embodiment of the present invention.

As shown in FIG. 1, the wireless audio transmitter 100 of the present invention includes a digital audio signal input unit 101, a channel analysis unit 102, an analog audio signal input unit 103, a digital audio signal converter 104, an UWB transceiver 105, a first beacon extraction/analysis unit 106, a transmission interval reservation management unit 107, a beacon generator 108 and a multiplexer (MUX) 109.

The digital audio signal input unit 101 receives a digital audio signal having more than one audio channels mixed from different digital audio sources such as TV, CD player, DVD player, MP3 player, FM/AM radio, etc.

The channel analysis unit 102 divides the digital audio signal from the digital audio signal input unit 101 by channels and analyzes characteristic of each channel.

The analog audio signal input unit 103 receives an analog audio signal that exists in the units of one or more audio channels from different analog audio sources.

The digital audio signal converter 104 converts the analog audio signal from the analog audio signal input unit 103 into a corresponding digital signal for each channel.

The UWB transceiver 105 scans an UWB channel when the wireless audio transmitter 100 is driven. At this time, the UWB transceiver 105 receives beacon frames from adjacent wireless audio transmitters and/or other UWB transmitters, and transfers it to the first beacon extraction/analysis unit 106 to be described later.

In addition, the UWB transceiver 105 converts the audio signal provided from the MUX 109 to be mentioned later in a UWB wireless communication scheme, and then sends the same.

The first beacon extraction/analysis unit 106 extracts and analyses the beacon frames from the adjacent wireless audio transmitter and/or other UWB transmitters, received through the UWB transceiver 105, to gather wireless audio transmitter information, audio source information, audio channel information, audio signal codec information, audio signal output volume information and reserved transmission interval information (hereinafter, referred to as "audio source information list").

The transmission interval reservation management unit 107 checks the audio source information list from the first beacon extraction/analysis unit 106 and calculates an available transmission interval that can be used for transmission of the audio signal by the audio sources of the transmitter 100. Through this, if there exists an available transmission interval for transmission of the audio signal of each channel provided from the channel analysis unit 102 and the digital audio signal converter 104, the transmission interval reservation management unit 107 reserves a transmission interval for each channel for the audio sources of the transmitter 100.

Here, the transmission interval reservation management unit 107 reserves the transmission interval in terms of MAS (Medium Access Slot). Details of the MAS will be omitted here because it is a known technique and thus will be easily understood by those skilled in the art.

Further, the transmission interval reservation management unit 107 controls the MUX 109 to be stated later so that a corresponding audio signal is sent in conformance with the reserved transmitted interval.

The beacon generator 108 generates a beacon frame that conform to the UWB wireless communication by employing channel characteristic information (for example, a bit rate, a compression type, etc.) of the audio signal and the audio source information provided from the channel analysis unit 102 and the digital audio signal converter 104, and the reserved transmission interval information of the audio signal from the transmission interval reservation management unit 107. A concrete description on the beacon frame will be given later with reference to FIG. 3.

The MUX 109 multiplexes the signals from the channel analysis unit 102, the digital audio signal converter 104, and the beacon generator 108 in accordance with a multiplexing control signal from the transmission interval reservation management unit 107, and outputs a multiplexed signal to the UWB transceiver 105.

Figure 2:
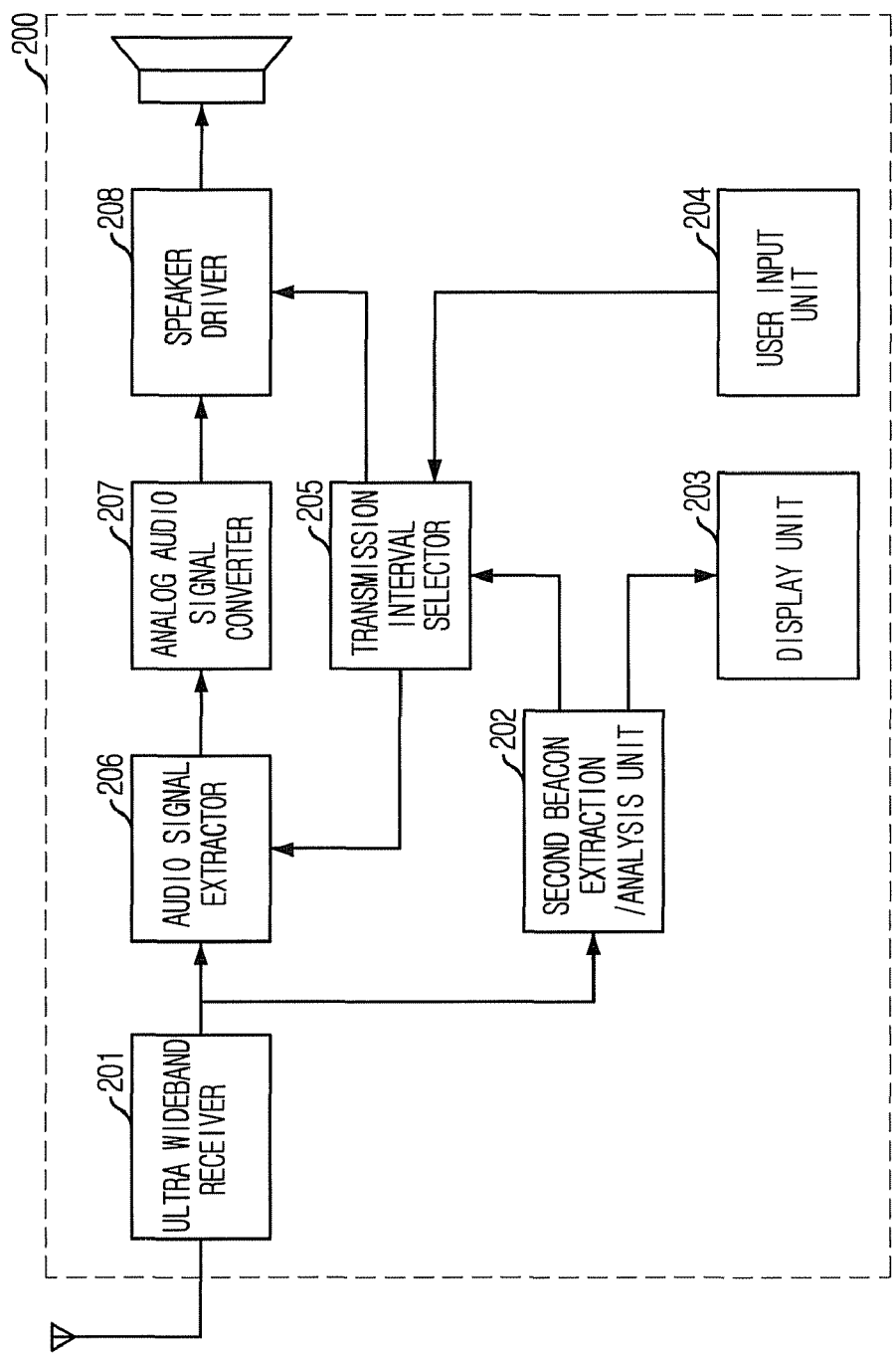
FIG. 2 is a block diagram illustrating the configuration of a wireless audio receiver in accordance with another preferred embodiment of the present invention.

FIG. 2 is a block diagram illustrating the configuration of a wireless audio receiver 200 in accordance with another preferred embodiment of the present invention.

As illustrated in FIG. 2, the wireless audio receiver 200 of the present invention includes an UWB receiver 201, a second beacon extraction/analysis unit 202, a display unit 203, a user input unit 204, a transmission interval selector 205, an audio signal extractor 206, an analog audio signal converter 207, and a speaker driver 208.

The UWB receiver 201 receives an audio signal and a beacon frame from the wireless audio transmitters 100 or other UWB.

The second beacon extraction/analysis unit 202 extracts and analyzes the beacon frame of the wireless audio transmitters 100 received from the UWB receiver 201 to create audio source information list. That is, the second beacon extraction/analysis unit 202 gathers wireless audio transmitter information, audio source information, audio channel information, audio signal codec information, audio signal output volume information and reserved transmission interval information that are the audio source information list of the wireless audio transmitter 100. Details of the audio source information list will be provided later with reference to FIG. 4.

In addition, the second beacon extraction/analysis unit 202 sends the audio source information list to the display unit 203 and the transmission interval selector 205.

The display unit 203 offers the audio source information list generated by the second beacon extraction/analysis unit 202 to the user in a human readable format.

The user input unit 204 provides the user with the audio source information and the audio channel information out of the audio source information list provided through the display unit 203. In other words, the user input unit 204 provides an interface that is necessary for the user to choose an audio source and an audio channel. At this time, the user input unit 204 forwards the audio source and audio channel information chosen by the user to the transmission interval selector 205.

The transmission interval selector 205 takes the audio source information list from the second beacon extraction/analysis unit 202 and further the audio source and audio channel information selected by the user in the user input unit 204. At this time, the transmission interval selector 205 controls the audio signal extractor 206 to be mentioned later based on a reserved transmission interval of the audio source and audio channel selected by the user so that the audio signal can be extracted from the designated reserved transmission interval.

Further, the transmission interval selector 205 extracts volume information of a desired audio signal from the audio source information list and controls the speaker driver 208 to be stated later, to thus adjust an output volume.

The audio signal extractor 206 extracts an audio signal corresponding to the audio source and audio channel selected by the user out of the audio signal transferred from the UWB receiver 201 under the control of the transmission interval selector 205.

The analog audio signal converter 207 converts the audio signal extracted by the audio signal extractor 206 into a corresponding analog signal.

The speaker driver 208 drives the speaker by using the analog signal from the analog audio signal converter 207. At this time, the speaker driver 208 controls a speaker volume according to the volume information received from the transmission interval selector 205.

Figure 3:
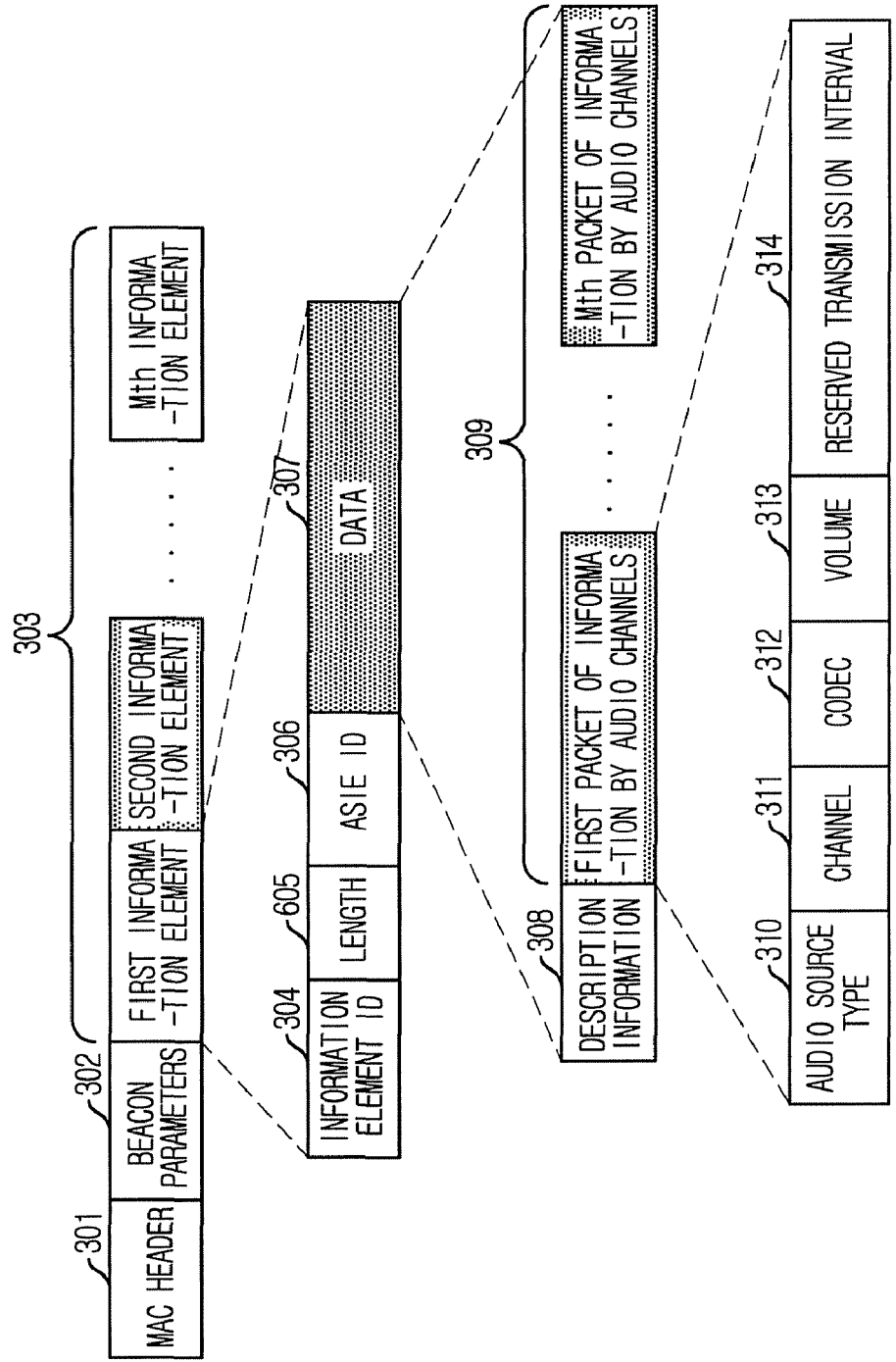
FIG. 3 is an explanatory diagram of a beacon frame to which the present invention is applied.

FIG. 3 is an explanatory diagram of a beacon frame to which the present invention is applied.

As exemplified in FIG. 3, the beacon frame to which the invention is applied is comprised of a MAC header 301, a beacon parameters 302, one or more information elements (IE) 303, which are used in the UWB wireless communication. Here, the information elements 303 are ASIE (Application Specific IE) that may be defined depending on application purposes of the user. At this time, the information elements 303 denote a packet of one or more information elements but are commonly described for convenience of explanation, as shown in FIG. 3.

The information elements 303 are composed of an information element ID 304, a length 305, an ASIE ID 306 and data 307. The information elements 303 are recognized as ASIE if a value of the information element ID 304 is 255. Here, the ASIE ID 306 is set for the wireless audio transmitter 100 to have a particular value that can be commonly recognized by adjacent wireless audio transmitters and the wireless audio receiver 200.

The data 307 is composed of description information 308 of the wireless audio transmitter 100 and a packet of one or more information for each audio channel 309. The description information 308 carries a human readable description of the corresponding wireless audio transmitter 100, so that the user can easily identify the transmitter through the display unit 203 of the wireless audio receiver 200. At this time, the packet of information by audio channels 309 is a packet of one or more information by audio channels but is commonly described for convenience, as shown in FIG. 3.

The packet of information by audio channels 309 contains an audio source 310 representing the source of an audio signal to the wireless audio transmitter 100, a channel 311 indicating which channel signal the audio source sends, a codec 312 denoting which digital compression type the channel signal uses, a volume 313 indicating volume level of the channel signal, and an reserved transmission interval 314 information representing which transmission interval is used. In particular, the reserved transmission interval 314 is preferably shown in the form of bit map where each transmission interval in terms of MAS is expressed in one bit.

Meanwhile, the items of the packet of information by audio channels 309 use specially coded values defined to minimize the length of beacon frame.

As mentioned above, the wireless audio transmitter 100 generates the beacon frame and then sends it, thereby transferring audio transmission information to one or more wireless audio receivers 200.

FIG. 4 is an explanatory diagram of one example of the audio source information list used in the present invention.

As shown in FIG. 4, part of the audio source information list to which the present invention is applied is provided from the wireless audio receiver 200 to the user through the display unit 203. The audio source information list contains wireless audio transmitter information 401, audio source information 402, audio channel information 403, audio signal codec information 404, audio signal output volume information 405, and reserved transmission interval information 406, each of which is listed in the form of table.

Especially, the audio source information 402, the audio channel information 403 and the audio signal codec information 404 which are part of the above information are delivered to the display unit 203.

The wireless audio transmitter information 401 shows that there are currently three different types of wireless audio transmitters 100 (that is, first, second and third transmitters). Here, the wireless audio transmitter information 401 preferably has a manufacturer and a model name of each audio source.

In addition, based on a unique identifier assigned for every the wireless audio transmitter 100 that is currently sending the audio signal, the wireless audio transmitter information 401 may be expressed distinguishably from each other.

The audio source information 402 denotes a type of an audio source that is applies to the wireless audio transmitter 100. That is, as in FIG. 4, the first transmitter accepts audio signals from DVD and TV. The second transmitter takes an audio signal from MP3. The third transmitter receives an audio signal from a mobile communication terminal.

The audio channel information 403 shows audio channels that are separated from the audio sources. That is, in the first transmitter, the audio source DVD has channels as follows: FL (Front-Left), FR (Front-Right), RL (Rear-Left), RR (Rear-Right), and SW (Sub-Woofer), which are representative examples of 5.1 channel. The audio source TV in the first transmitter and MP3 in the second transmitter, both have channels: L (left) and R (right). In the third transmitter, the audio source mobile communication terminal has only L (left) channel.

The audio signal codec information 404 indicates what type of compression is used for specific channel. In FIG. 4, in the first transmitter, the audio source DVD uses audio coding-3 (AC-3) for each channel. In the first transmitter, the audio source TV uses SBC (Sub Band Coding) for each channel. In the second transmitter, the audio source MP3 uses MPEG-3 for each channel. In the third transmitter, the audio source mobile communication terminal uses pulse coding modulation (PCM).

The audio signal output volume information 405 represents a volume level of a target channel set in the wireless audio transmitter 100.

The reserved transmission interval information 406 indicates a transmission interval being occupied by each audio channel.

As set forth above, the wireless audio transmitter 100 transmits the audio source information in its beacon frame.

Subsequently, the wireless audio receiver 200 receives and analyzes a beacon frame depending on a wireless audio transmitter, the types of an audio source and an audio channel selected by the user, and thereafter, inquires the audio source information list and extracts a digital audio signal at the corresponding reserved transmission interval. Then, the wireless audio receiver 200 converts the extracted digital audio signal into an analog audio signal in conformance with the codec and then outputs it through the speaker.

Figure 5A:
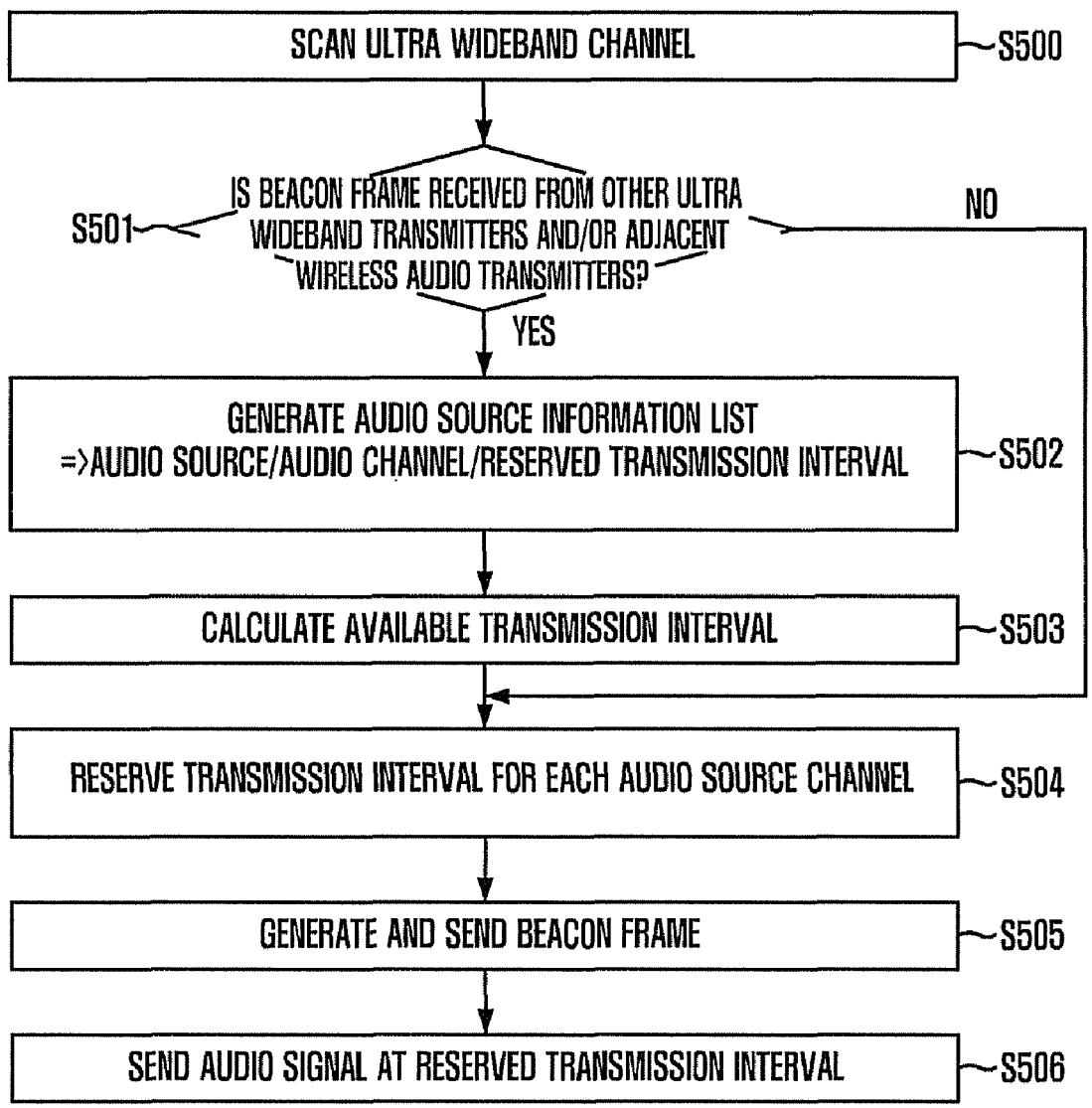
FIG. 5A is a flowchart illustrating a transmission method of an audio signal using an UWB wireless communication scheme in accordance with another preferred embodiment of the present invention.

FIG. 5A is a flowchart illustrating a transmission method of an audio signal using the UWB wireless communication scheme in accordance with another preferred embodiment of the present invention.

As shown in FIG. 5A, when the wireless audio transmitter 100 is driven, it scans an UWB wireless channel to check whether an UWB network has been already set up at step S500. At this time, the wireless audio transmitter 100 checks at step S501 as to whether there is a reception of at least one beacon frames that are sent from other UWB transmitters and/or adjacent wireless audio transmitters during step S500. If the wireless audio transmitter 100 receives the beacon frame, it checks whether an UWB network is currently configured and further checks whether there are other UWB transmitters and/or adjacent wireless audio transmitters.

Subsequently, if the wireless audio transmitter 100 receives the beacon frame from other UWB transmitters and/or adjacent wireless audio transmitter, at step S502, it extracts and analyzes the beacon frame to gather an information about a wireless audio transmitter/audio source/audio channel/output volume/reserved transmission interval, which are the audio source information list.

Then, the wireless audio transmitter 100 calculates an available transmission interval by channels that its own audio sources can use for transmission of an audio signal by using the information in the audio source information list at step S503.

If the wireless audio transmitter 100 calculates the available transmission interval by channels that its own audio sources can use for transmission of an audio signal, it reserves a transmission interval for each channel of its own audio sources at step S504.

In addition, even if the wireless audio transmitter 100 does not receive the beacon frame of adjacent wireless audio transmitters at step S502, it reserves a transmission interval for each channel of its own audio sources, as in step S504.

Next, the wireless audio transmitter 100 generates a beacon frame by using the reserved transmission interval information by each audio source channel generated in step S504, audio source information and audio channel information of an audio signal being currently received, and sends it according to the UWB wireless communication standard at step S505.

Then, the wireless audio transmitter 100 is connected to the UWB network previously configured or creates a new UWB network, and sends each audio signal at the transmission intervals reserved by audio sources and audio channels at step S506.

Figure 5B:
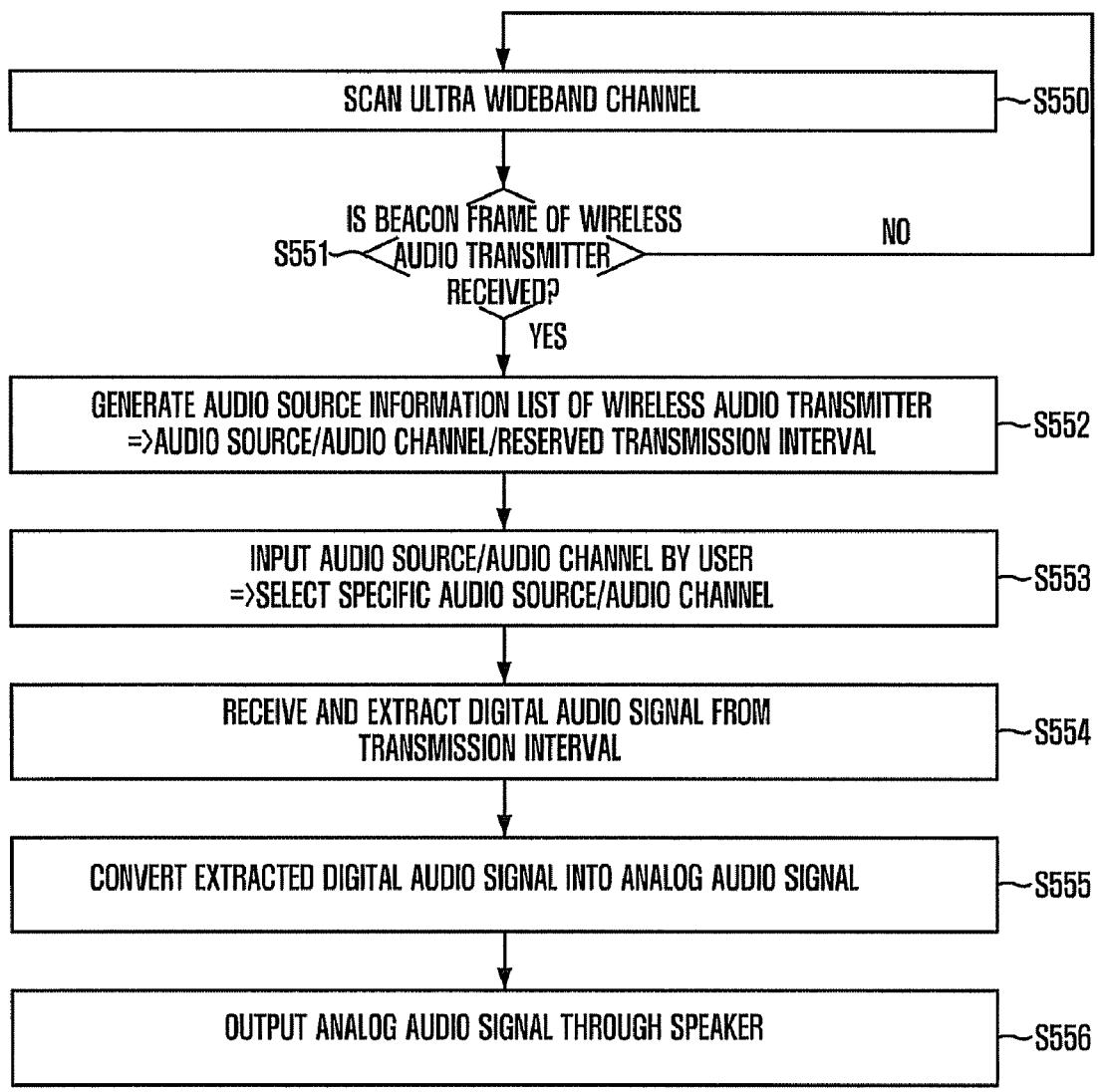
FIG. 5B is a flowchart illustrating a reception method of an audio signal using an UWB wireless communication scheme in accordance with another preferred embodiment of the present invention.

FIG. 5B is a flowchart illustrating a reception method of an audio signal using the UWB wireless communication scheme in accordance with another embodiment of the present invention.

As shown in FIG. 5B, when the wireless audio receiver 200 is driven, it scans an UWB wireless channel to check whether an UWB network has been already configured at step S550. At this time, the wireless audio receiver 200 checks at step S551 as to whether there is a reception of at least one beacon frames that are sent from wireless audio transmitters (hereinafter, commonly referred to as the wireless audio transmitter 100 of FIG. 5A for explanation) during step S550.

If the wireless audio receiver 200 receives the beacon frame, it checks whether an UWB network is currently configured and further checks whether there are one or more wireless audio transmitters 100.

Then, if the wireless audio receiver 200 receives the beacon frame from adjacent wireless audio transmitter, it extracts and analyzes the beacon frame to generate an information list about a wireless audio transmitter/audio source/audio channel/output volume/reserved transmission interval that are the audio source information list at step S552.

At this time, the wireless audio receiver 200 provides the user with the audio source information list generated in step S552 so that it can receive information on an audio source and an audio channel of a specific wireless audio transmitter selected by the user at step S553.

Thereafter, the wireless audio receiver 200 selects the audio source and audio channel depending on the information on the audio source and audio channel of the specific wireless audio transmitter inputted by the user, and receives and extracts a digital audio signal at the reserved transmission interval by channels to be used by the audio source at step S554.

At this time, the wireless audio receiver 200 converts the digital audio signal extracted in step S554 into an analog audio signal and then outputs it through the speaker at steps S555 and S556.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claims.

What is claimed is:

1. A wireless audio transceiver system using a UWB (Ultra Wideband) wireless communication, comprising:
   a wireless audio transmitter transmitting an audio signal by channels during reserved transmission intervals indicated in a first beacon frame; and
   a wireless audio receiver gathering information on audio sources from received beacon frames, extracting an audio signal from the reserved transmission intervals, and sending the extracted audio signal through a sound output unit.

2. The wireless audio transceiver system of claim 1, wherein the wireless audio transmitter includes:
   a first beacon extraction/analysis unit for extracting and analyzing the first beacon frame received from other UWB transmitters and/or wireless audio transmitters by a UWB transceiver to gather information about audio sources, including audio channels and reserved transmission intervals of the other UWB transmitters and/or wireless audio transmitters;
   a transmission interval reservation management unit for checking information on the audio sources, including the audio channels; and reserved transmission intervals previously reserved by the other UWB transmitters and/or wireless audio transmitters, and calculating an available transmission interval for one or more input audio sources to reserve the transmission interval;
   a beacon generator for generating and outputting a second beacon frame by using the reserved transmission interval information from the transmission interval reservation management unit and the information on a source and channel of the audio signal from a channel analysis unit and a digital audio signal converter; and
   a multiplexer for multiplexing the signals from the channel analysis unit, the digital audio signal converter and the beacon generator in accordance with a control signal from the transmission interval reservation management unit to transfer a multiplexed signal to the UWB transceiver.

3. The wireless audio transceiver system of claim 2, wherein the wireless audio receiver includes:
   a second beacon extraction/analysis unit for extracting and analyzing the second beacon frame from any one of other wireless audio transmitters, received from a UWB receiver, to gather information about audio sources, including audio channels and reserved transmission intervals of the other UWB transmitters and/or wireless audio transmitters;
   a user interface for providing a user with the information on the audio sources, the audio channels and the reserved transmission intervals generated by the second beacon extraction/analysis unit, and accepting the information on an audio source and an audio channel selected by the user; and
   a transmission interval selector for controlling the audio signal extractor to extract the audio signal selected at the reserved transmission intervals based on the information generated by the second beacon extraction/analysis unit and the information selected through the user interface.

4. The wireless audio transceiver system of claim 3, wherein the transmission interval reservation management unit reserves the transmission interval on MAS (Medium Access Slot) basis for each audio channel.

5. The wireless audio transceiver system of claim 4, wherein the beacon frame in the beacon generator contains at least one ASIE (Application Specification Information Element) that can be defined depending on application purposes of the user,
   the reservation transmission interval information in the ASIE is displayed in the form of bit map so that one interval unit is expressed in one bit.

6. The wireless audio transceiver system of claim 1, wherein the information on audio sources comprises output volume information.

7. A transceiving method of an audio signal using a UWB (Ultra WideBand) wireless communication scheme, the method comprising:
   when a first beacon frame is received from other UWB transmitters and/or adjacent wireless audio transmitters, extracting and analyzing the first beacon frame to generate reserved transmission interval information previously reserved by the other UWB transmitters and/or adjacent wireless audio transmitters and information on audio source and channel;

calculating an available transmission interval for each channel of audio sources by using the information on the audio source and channel of the other UWB transmitters and/or adjacent wireless audio transmitters and the reserved transmission interval information, and reserving the transmission interval;

generating and transmitting a second beacon frame based on the reserved transmission interval information and the audio source and channel information;

transmitting the audio signal at the reserved transmission interval per audio source and channel units;

when the transmitted second beacon frame is received, extracting and analyzing the second beacon frame to gather audio source and channel information and reserved transmission interval information; and providing the audio source and channel information to a user, and extracting and outputting the audio signal from the selected reserved transmission interval when the audio source and channel information is selected by the user.

8. The method of claim 7, further comprising reserving a transmission interval for each channel of audio sources to be transmitted when the beacon frame of the other UWB transmitters and/or adjacent wireless audio transmitters is not received in the extracting and analyzing.

9. The method of claim 7, further comprising adjusting, after the providing, extracting and outputting, a speaker volume in accordance with volume information of the audio signal that is extracted and analyzed from the beacon frame.

10. A wireless audio transmitter, comprising:
an audio signal input unit for receiving an audio signal from one or more audio sources;
an Ultra Wideband (UWB) transceiver for receiving beacon frames from adjacent wireless audio transmitters and/or other UWB transmitters;
a beacon extraction/analysis unit for determining information regarding audio sources from a first beacon frame received by the UWB transceiver;
a transmission interval reservation management unit for determining an available transmission interval with respect to the information regarding audio sources from the first beacon frame; and
a beacon generator for generating a second beacon frame according to the transmission interval determined by the transmission interval reservation management unit,
wherein the UWB transceiver transmits an output signal with respect to the audio signal and the second beacon frame.

11. The wireless audio transmitter of claim 10, further comprising a multiplexer to generate the output signal to be transmitted by the UWB transceiver by multiplexing the audio signal and the signal output by the beacon generator, with respect to a signal from the transmission interval reservation management unit and the beacon generator.

12. The wireless audio transmitter of claim 10, wherein the audio signal comprises information on audio channels and output volume information.

13. A wireless audio receiver, comprising:
an Ultra Wideband (UWB) receiver for receiving beacon frames from adjacent wireless audio transmitters and/or other UWB transmitters;
a beacon extraction/analysis unit for determining information regarding audio sources from a beacon frame received by the UWB receiver;
a selection unit for selecting an audio source;
an audio signal extractor for extracting an audio signal from the information regarding audio sources, according to the selected audio source;
a transmission interval selector for controlling the audio signal extractor according to the selected audio source; and
a sound output unit for outputting a signal according to the audio signal extracted by the audio signal extractor.

14. The wireless audio receiver of claim 13, further comprising:
an analog audio signal converter for converting the audio signal extracted by the audio signal extractor to a corresponding analog signal,
wherein the sound output unit includes a speaker element for outputting the corresponding analog audio signal.

15. The wireless audio receiver of claim 13, wherein the audio signal comprises information on audio channels and output volume information.

* * * * *